United States Patent
Miller et al.

(10) Patent No.: US 8,223,172 B1
(45) Date of Patent: Jul. 17, 2012

(54) REGIONAL MAP ZOOM TABLES

(75) Inventors: Andrew Tesch Miller, Seattle, WA (US); Keith Ito, Cambridge, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/244,758

(22) Filed: Sep. 26, 2011

(51) Int. Cl.
*G09G 5/00* (2006.01)
(52) U.S. Cl. ........................................ 345/660; 701/455
(58) Field of Classification Search .................. 345/660; 701/455
See application file for complete search history.

(56) References Cited

U.S. PATENT DOCUMENTS

| | | | |
|---|---|---|---|
| 2004/0030493 A1* | 2/2004 | Pechatnikov et al. | 701/208 |
| 2009/0182500 A1* | 7/2009 | Dicke | 701/208 |

OTHER PUBLICATIONS

Bing Maps AJAX Control, Version 7.0 (2011).
Sample et al., "Tile-Based Geospatial Information System: Principles and Practices," pp. xi-xiv, 193-203 (Springer 2010).

* cited by examiner

*Primary Examiner* — Maurice L McDowell, Jr.
(74) *Attorney, Agent, or Firm* — Marshall, Gerstein & Borun LLP (57) ABSTRACT

A graphics or image rendering system builds application-oriented tables on a server that are downloaded to a client device responsive to a request for map data from the client device in association with a mapping application at the client device. The table or tables specify by geographic region which zoom levels have map data different from other zoom levels and may apply to many types of map data including map vector data, map label data, satellite image data, traffic data, transit status, etc. The table or tables allow the mapping application to skip zoom levels for which no new data is available, or conversely, reuse data from other levels when rendering a level not requiring new data from the server.

17 Claims, 8 Drawing Sheets

REGIONAL MAP ZOOM TABLES

FIELD OF TECHNOLOGY

The present disclosure relates to image rendering systems, such as electronic map display systems, and more specifically to the use a table of feature data organized by zoom level for placing label and other feature information when changing zoom levels.

BACKGROUND

Digital maps are found in and may be displayed by a wide variety of devices, including mobile phones, car navigation systems, hand-held GPS units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are different manners of digitally rendering map images (referred to as digital map images) based on map data stored in a map database. One method of rendering a map image is to store map images within the map database as sets of raster or pixilated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific map objects or elements (also referred to as primitives) to be displayed as part of an image via an image display device. In the context of a map image, such map elements or primitives may be, for example, individual roads, text labels, areas, text boxes, buildings, points of interest markers, terrain features, bike paths, terrain or street labels, etc. Thus, for any particular image element, the map database stores a set of various attributes defining properties of the element.

During the image rendering process, a client mapping engine takes the primitives to generate a set of shapes using one or more technologies such as Open GL. The use of vector graphics can be particularly advantageous in a mobile map system in which image data is sent from a centralized map database via a communications network (such as the Internet, a wireless network, etc.) to one or more mobile or remote devices for display. In particular, vector data, once sent to the receiving device, may be more easily scaled and manipulated (e.g., rotated, etc.) than pixilated raster image data. However, the processing of vector data is typically much more time consuming and processor intensive on the image rendering system that receives the data.

In the case of both rasterized map images and vector data generated images, text or other legend symbols, such as those used to label streets, roads and other features of a map, may be downloaded and displayed. The labels are generally placed on or proximately near to a map object for which the label identifies or provides information. Generally, each time a zoom level of a computerized map is changed or adjusted, labels may be downloaded and redrawn.

SUMMARY

A computer-implemented method for providing map data to a client device includes receiving, at a server from the client device over a network, a request for map data for a region of interest, where each region of interest is a separate geographic area. The method includes generating, at the server, map data for the region of interest at a first zoom level and determining, at the server, availability of data by zoom level for the region of interest. The method further includes generating a local zoom table at the server for use by the client device, where the local zoom table indicates each zoom level for which new map data is available and sending the map data and the local zoom table for the region of interest to the client device.

In another embodiment, a computer server includes a communications network interface, a processor, a memory coupled to the processor, and a first routine, stored in the memory, that executes on the processor to receive, via the communications network interface, a request for map data from a computer device. The computer server also includes a second routine, stored in the memory, that executes on the processor to parse the request to identify a geographic region corresponding to the request and a third routine, stored in the memory, that executes on the processor to analyze map data that is available for the geographic region and identifies zoom levels for which map data is available. The computer server further includes a fourth routine, stored in the memory, that executes on the processor to generate a zoom progression table that specifies zoom levels for which map data is available, and a fifth routine, stored in the memory, that executes on the processor to send i) the map data for at least one zoom level for the geographic region and ii) the zoom progression table to the computer device via the communications network interface.

In yet another embodiment, a computer-implemented method for generating information at a server includes receiving a request for map data from a map application running on a client device, identify, using the request, a map application and a geographic region to which the request applies, where the geographic region is selected from a plurality of geographic regions. The method generates map data for the map application, with the map data covering the geographic region over one or more zoom levels. The method further generates a zoom progression table applicable to the map application running on the client device, where the zoom progression table specifying zoom levels for which map data is available and sends the map data and the zoom progression table to the requesting device.

DETAILED DESCRIPTION

Conceptually, a map at the lowest zoom level fits the entire contents of the available map region on a display. For example, a world map at zoom 0 would show the entire Earth using some known projection technique. A conceptual description of this full image is a map tile, or simply, a tile. For the sake of illustration, assume the tile is a square, although other shapes are possible and, in some cases, part of the tile may be outside a viewing window of a particular display.

Zooming in causes, in some embodiments, replacing the initial single tile with four tiles covering the area of the first tile. Zooming in continues through successive zoom levels at a geometric progression with each tile being replaced by four tiles until a fixed limit is reached or a practical minimum for a given application is reached. For example, there is little reason for a street map application to show less than a width of a street.

While map data may be stored in a database or backend system in discrete zoom levels, a vector map rendering system need not operate on discrete zoom levels because features are described geometrically instead of as bitmaps or raster images. A particular feature, for example, a road described by its centerline and width may be downloaded at a given zoom level and used over several zoom levels or until the feature moves out of view.

In addition to map image or vector data, additional information such as labels or symbols may be stored in the map database and downloaded to the client device to be displayed with corresponding features to provide labels for the features, additional information about a feature, etc. As above, scalable fonts such as those used in a page description language can also be applied over a range of zoom levels.

After receiving a request for map data, a map server prepares data for use at the map client. Some geographic regions have more map data than other regions. Using a simplistic example, an urban area is likely to have more detail at more zoom levels than a desert. However, in a default case when a map client assumes there will be data for each typical zoom level, the map client may use valuable network and computing resources attempting to retrieve and process data for zoom levels for which there is simply no new data. To address this, when a request for data is received, the geographic area of the request, or region of interest, is identified and the map server may create a custom zoom table for that region. This region-specific zoom table can detail the zoom levels for which new map data is available.

The region-specific zoom table may separate map feature data and map label data by zoom level. That is, some map data may reuse map feature data between two or more zoom levels but the map label information may be changed between levels. The custom zoom table may be further specialized to the type of application. Conversely, in some embodiments the map label data may be constant across more than one zoom level but the map feature data may change. Different embodiments may specify each data type separately, if desired.

Different applications use different types of data. A driving direction application is more concerned with street level data than, for example, a general mapping application, and therefore, may not send new data at every zoom level in the low zoom levels where entire countries are visible. In this case, raster data and labels may be sent at low zoom levels because it is less data intensive than vector data for that size of a region. However, in this case, zooming without sending new data may incur some blurriness as the raster data is simply enlarged before a zoom level with new raster or vector data is sent. Additionally, some geographic areas have rich geometric and feature data so that new data must be downloaded at each zoom level. Generally, a default zoom level has no new geometrical information over a span of zoom levels, for example, zoom levels 14-16 may use the same vector data. However, each level may display different labels. The use of a table of feature data, for example, for levels 14-16, allows the user to zoom within that range and display zoom-level designated labels without downloading new text strings and/or symbols as the zoom level changes. If the zoom level changes beyond the data available in the table of feature data, a new table of feature data can be downloaded.

These regional and/or application-specific zoom tables may be generated at the map server and cached, for example for a popular urban area, or may be generated on-the-fly on a request-by-request basis.

Figure 1:
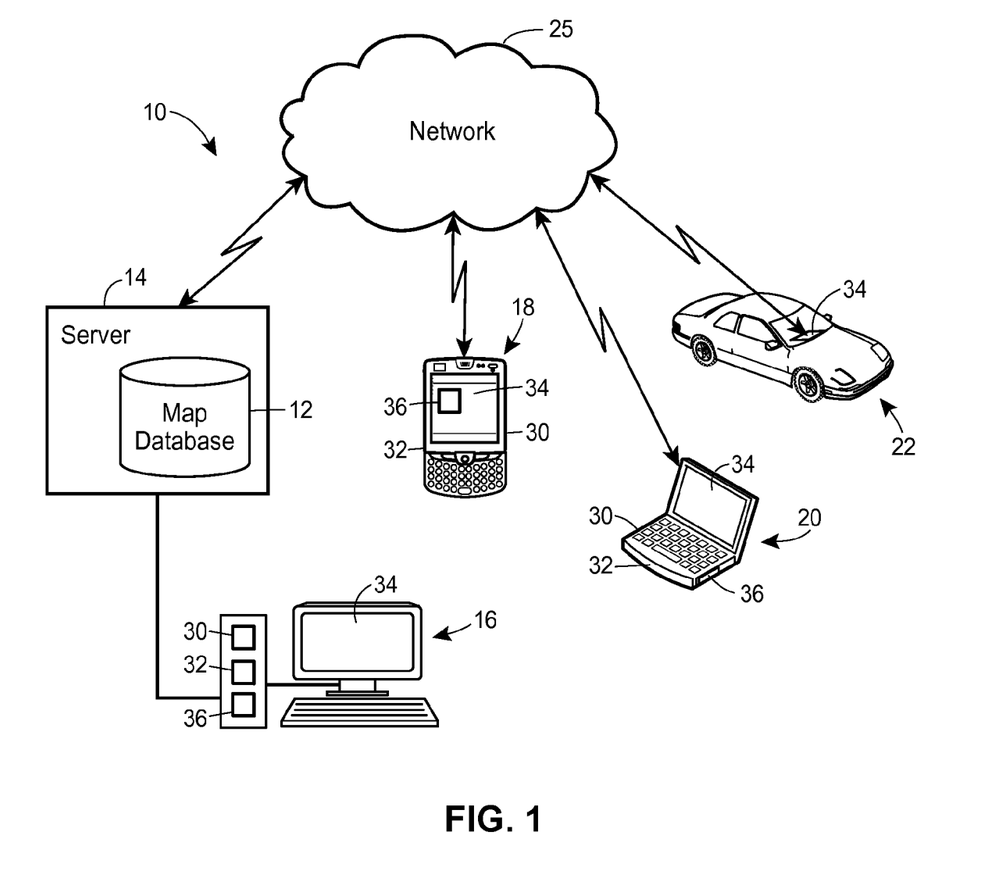
FIG. 1 is a high level block diagram of a map imaging system that implements communications between a map database stored in a server and one or more map image rendering devices.

Referring now to FIG. 1, a map-related imaging system 10 includes a map database 12 stored in a server 14 or in multiple servers located at, for example, a central site or at various spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless LAN, MAN or WAN, the Internet, or any combination thereof. The map client devices 16-22 may be, for example, mobile phone devices (18), computers such a laptop, desktop or other types of computers (16, 20) or components of other imaging systems such as components of automobile navigation systems (22), etc. Moreover, the client devices 16-22 may be communicatively connected to the server 14 via any suitable communication system, such as any publically available or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data and vector image map data. However, the image rendering systems described herein are well suited for use with vector image data which defines or includes a series of vertices or vertex data points for each of numerous sets of image objects, elements or primitives within an image to be displayed. Generally speaking, each of the image objects defined by the vector data will have a plurality of vertices associated therewith and these vertices will be used to display a map related image object to a user via one or more of the client devices 16-22.

As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Figure 2:
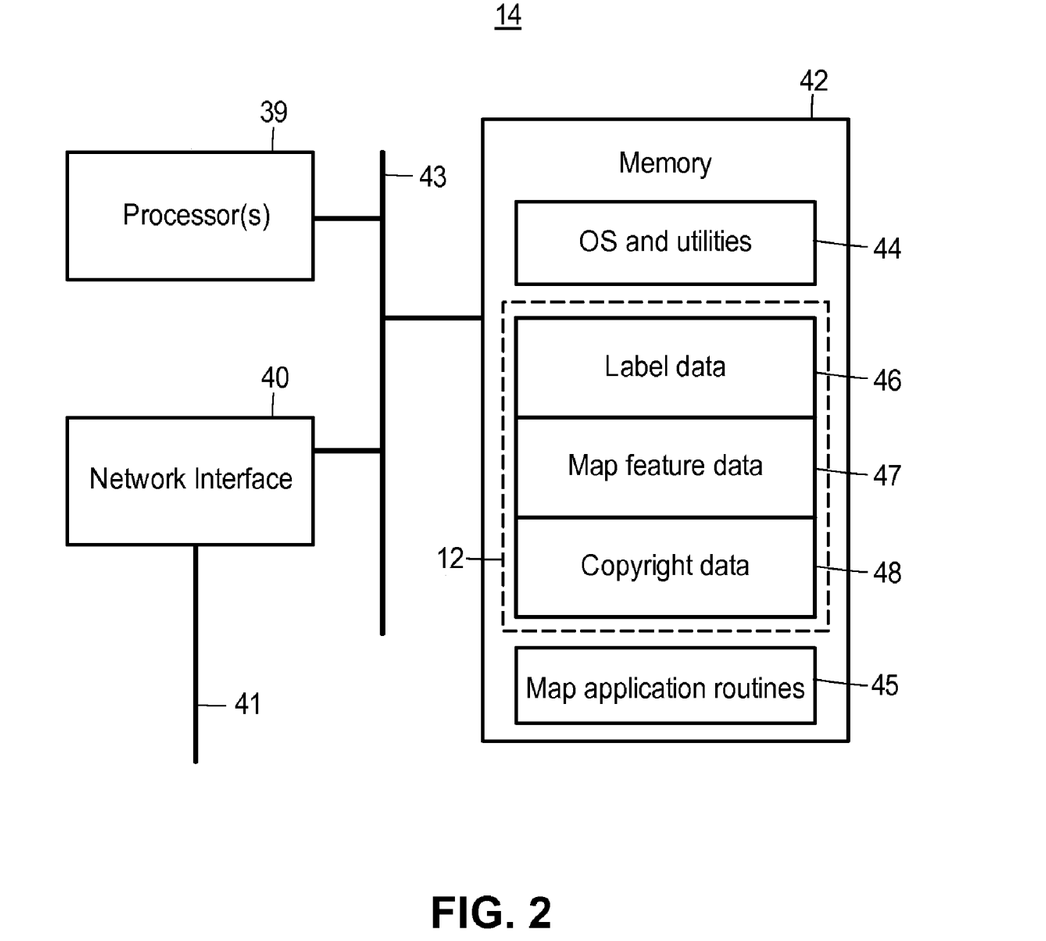
FIG. 2 is a high level block diagram of an image rendering engine used to render map images using map vector data.

Referring now to FIG. 2, an exemplary server 14, such as server 14 of FIG. 1, includes a processor 39, a network interface 40 connecting the server 14 to an external network 41 and a memory 42. The processor 39 may, in practice include more than one processor or the server 14 itself may be an arrangement of servers, such as interconnected blade servers. The processor 39, network interface 40, and memory 42, as well as other components common to a server and not illustrated, may be connected by one or more data buses 43. A number of processors and databus architectures are known and include those from well known hardware manufacturers such as Intel® and AMD®.

The memory 42 may be a combination of hardware memories, such as, RAM, ROM, solid state disks and/or rotating media and may also include both fixed and removable physical media. The memory may store both data and executable code, including but not limited to an operating system and utilities 44, the map database 12, and one or more map application routines 45. The map database may include label data 46, map feature data 47 in the form of image data, vector data, or both, and one or more type tables 48 describing style information by zoom level for feature types and associated label data. The map application routines may include those used to respond to individual client device requests for map data, as further described below.

Figure 3A:
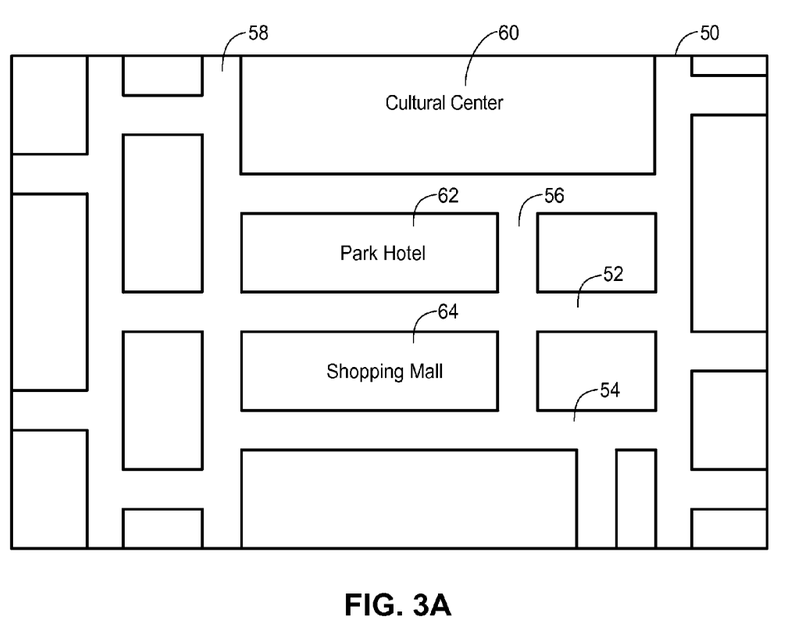
FIG. 3A is a depiction of a computer displayed map at a first zoom level showing a limited number of feature elements.

FIG. 3A illustrates an exemplary viewing window 50 displaying a depiction of a portion of a city. The depiction shows streets 52 and 54 as well as streets 56 and 58. Streets at this zoom level are not labeled. The illustration also shows certain buildings labeled with a building name. For example, shown are a cultural center 60, a Park hotel 62, and a shopping mall 64. For the purpose of illustration, the depiction of FIG. 3A is designated as a zoom level 14.

Map features, such as streets, generated from vector image data, in some embodiments, may be used in generating maps at more than one zoom level. For example, vector image data downloaded for a map zoom level 14 may also be used for map zoom levels 13 and 15. As discussed above, label positioning rules may dictate what feature labels or details are presented at a given zoom level to present the user with a comprehensive map with enough feature labels to orient the user and still appear uncluttered.

Figure 3B:
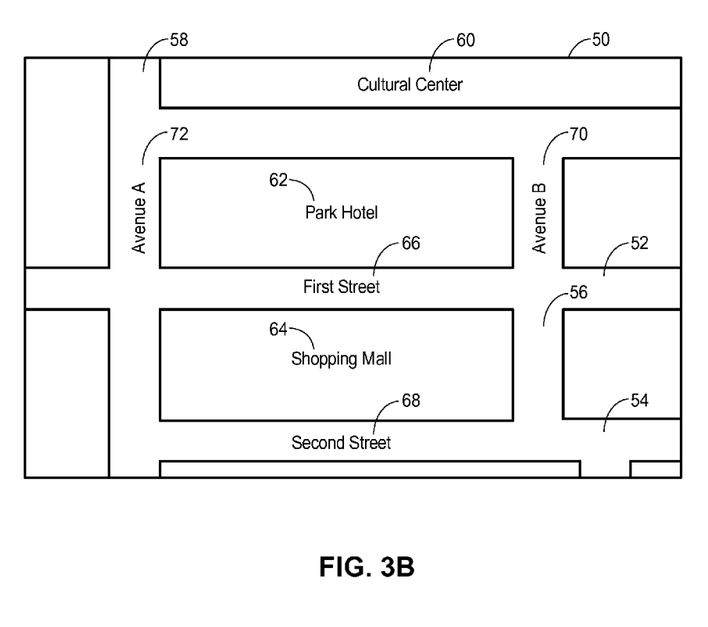
FIG. 3B is a depiction of a computer displayed map of FIG. 3A at a second zoom level showing a more feature elements.

FIG. 3B illustrates a closer zoom of the map area of FIG. 3A and for the sake of illustration will be designated as a zoom level 15. As discussed below, this zoom area may not require new map vector data, but may reuse map vector data provided for the depiction of FIG. 3A. FIG. 3B still shows streets 52, 54, 56, and 58 as in FIG. 3A. The depiction of FIG. 3B also shows the labeled buildings of FIG. 3A, the Cultural Center 60, the Park hotel 62, and the shopping mall 64. In addition, new label data is shown. Street 52 is labeled First Street 66, street 54 is labeled Second Street 68, Street 56 is labeled Avenue B 70, and streets 58 is labeled Avenue A 72. The new label data may have been downloaded for this zoom level even though the map vector data is reused. This is discussed in further detail below.

Figure 3C:
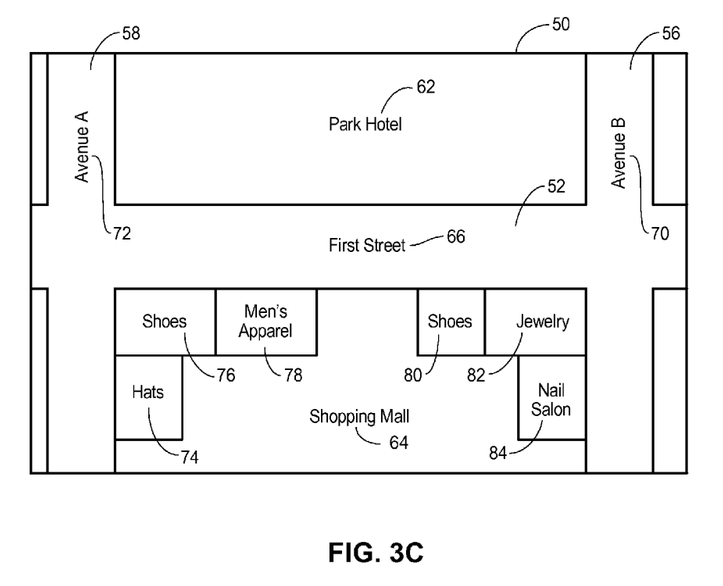
FIG. 3C is a depiction of the map of 3B at a higher zoom level showing more feature elements.

As depicted in FIG. 3C, viewing window 50 displays a smaller area of the map shown in FIGS. 3A and 3B at a higher zoom level and shows a greater resolution of details of the map. In this case, the zoom level of the viewing window corresponds to a higher magnification than the zoom level of FIG. 3B so that a scale ratio (viewing window length over actual map distance) of FIG. 3C is larger than that of 3B. As depicted in FIG. 3C, street features 52, 60, and 64 are shown as well as their corresponding label data, 54, 62, and 64, respectively. The feature labels "Park Hotel" 66 and "Shopping Mall" 68 are also shown in FIG. 3C. Because the zoom level has caused the feature associated with the label "Cultural Center" 62 to be outside the viewing window 50, so, that feature label is not included. FIG. 3C also illustrates additional text and symbol information not shown at previous zoom levels. As shown in this exemplary embodiment, store outlines in the shopping center are labeled by type. FIG. 3C shows store outlines labeled "Hats" 74, "Shoes" 76, "Men's Apparel" 78, "Shoes" 80, "Jewelry" 82, and "Nail Salon" 84. Other feature labels may be used that show, for example, brand names, etc. The store outlines may be symbols in the feature data, may be image vector data shown only at this zoom level, or may be part of new image vector data downloaded for this zoom level.

Table 1, below, illustrates an embodiment of a default zoom progression table, or simply, a zoom table. The default table illustrated in Table 1 shows that in an exemplary case new image vector data is only available for a limited number of zoom levels of zoom levels typically supported, such as 19. Table 1 also illustrates that while map vector data and label data may most often be available together at a particular zoom level it is not necessarily true for every zoom level. As illustrated in table 1, zoom level 12 has new image vector data even though there is no new label data while at zoom levels 13 and 19 new label data is available even though new image vector data is not. Zoom levels for which no new information is available have been collapsed from the table. Some embodiments may include those zoom levels. Even though Table 1, and other tables illustrated herein, are shown in human readable text table formats, other forms of expressing the same information are possible, including binary data, compressed data, compressed/encrypted data, etc.

The default table of Table 1 is not region specific and does not apply to any particular geographic area. The default table may be used as a base for generating region-specific tables or may be used when no region-specific table is available for a particular geographic area.

TABLE 1

| Application:<br>Street level<br>Zoom level | Region:<br>Default<br>Map Vector<br>Data | Label<br>Data |
|---|---|---|
| 1 | Yes | Yes |
| 5 | Yes | Yes |
| 8 | Yes | Yes |
| 9 | Yes | Yes |
| 10 | Yes | Yes |
| 12 | Yes | No |
| 13 | No | Yes |
| 15 | Yes | Yes |
| 18 | Yes | Yes |
| 19 | No | Yes |

Table 2 illustrates a region-specific table for a particular geographic area, although the specific region and data in Table 2 are for illustration only. As depicted in Table 2, more zoom levels have information available, map or image vector data as well as label data, although both are over the same 19 zoom levels.

When map data is requested by a client device and used by a map application running on the client device, the map application can use the information in two ways, together or separately. First, the map application can present only those zoom levels for which updated information is available. In cases where vector data can be scaled at a number of zoom levels, each zoom level may be presented, even if current data is reused at a different scale factor. Second, the map application can avoid making requests to the server for zoom levels that have no additional data, saving time and bandwidth.

TABLE 2

| Application: Street level Zoom level | Region: Southeast Canada Map (Image) Vector Data | Label Data |
|---|---|---|
| 1 | Yes | Yes |
| 2 | No | No |
| 3 | No | No |
| 4 | Yes | Yes |
| 5 | Yes | Yes |
| 6 | No | Yes |
| 7 | Yes | Yes |
| 8 | Yes | Yes |
| 9 | Yes | Yes |
| 10 | Yes | Yes |
| 11 | No | No |
| 12 | Yes | No |
| 13 | No | Yes |
| 14 | No | No |
| 15 | Yes | Yes |
| 16 | Yes | Yes |
| 17 | No | No |
| 18 | Yes | Yes |
| 19 | No | Yes |

Table 3 illustrates another region-specific table for a particular geographic area. As above, the specific region and data are for illustration only. As depicted in Table 3, each zoom level has additional map vector data as well as label data. In addition, Table 3 shows 20 levels of zoom as opposed to a default number of 19. This may occur when for a particular area there is a particularly rich set of map data. Conversely, some maps may have fewer than a default number of zoom levels, for example, in an uninhabited desert region.

Some map application embodiments may standardize on a fixed number of zoom levels, selected to cover a wide range of map data viewing requirements. In these embodiments, Table 3 would be restricted to, for example, 19 levels of the map designers choosing and Table 2, for example, illustrates a 19 zoom level application but for which 5 levels have no separate or unique data.

However, in other map applications, map visualization may be a dynamic process, in which case Table 2 essentially specifies a 14 zoom level map application and Table 3 specifies a 20 zoom level map. The total number of selectable zoom levels may be used when generating the map view at the client device, for example, to show the number of zoom levels available, if displayed.

TABLE 3

| Application: Street level Zoom level | Region: East Central Japan Map Vector Data | Label Data |
|---|---|---|
| 1 | Yes | Yes |
| 2 | Yes | Yes |
| 3 | Yes | Yes |
| 4 | Yes | Yes |
| 5 | Yes | Yes |
| 6 | Yes | Yes |
| 7 | Yes | Yes |
| 8 | Yes | Yes |
| 9 | Yes | Yes |
| 10 | Yes | Yes |
| 11 | Yes | Yes |
| 12 | Yes | Yes |
| 13 | Yes | Yes |
| 14 | Yes | Yes |
| 15 | Yes | Yes |
| 16 | Yes | Yes |
| 17 | Yes | Yes |
| 18 | Yes | Yes |
| 19 | Yes | Yes |
| 20 | Yes | Yes |

Table 4 illustrates another embodiment for the use of the zoom table. In this example, only a limited set of zoom level information is downloaded and may be tied to an initial zoom level plus or minus one zoom level. In an embodiment, more than one zoom level on each side of an initial zoom level can be created and downloaded based on expected user need, application type, etc., up to all possible zoom levels as illustrated above. Additionally, Table 4 illustrates that the zoom table may include other types of available data, such as traffic information as shown. Other data types may include satellite images or other raster data, transit information, weather warnings, etc.

TABLE 4

| Application: Street level Zoom level | Region: Upper Midwest, USA Map Vector Data | Label Data | Traffic data |
|---|---|---|---|
| ... | | | |
| 14 | Yes | Yes | Yes |
| 15 | No | Yes | Yes |
| 16 | Yes | Yes | Yes |
| ... | | | |

Figure 4:
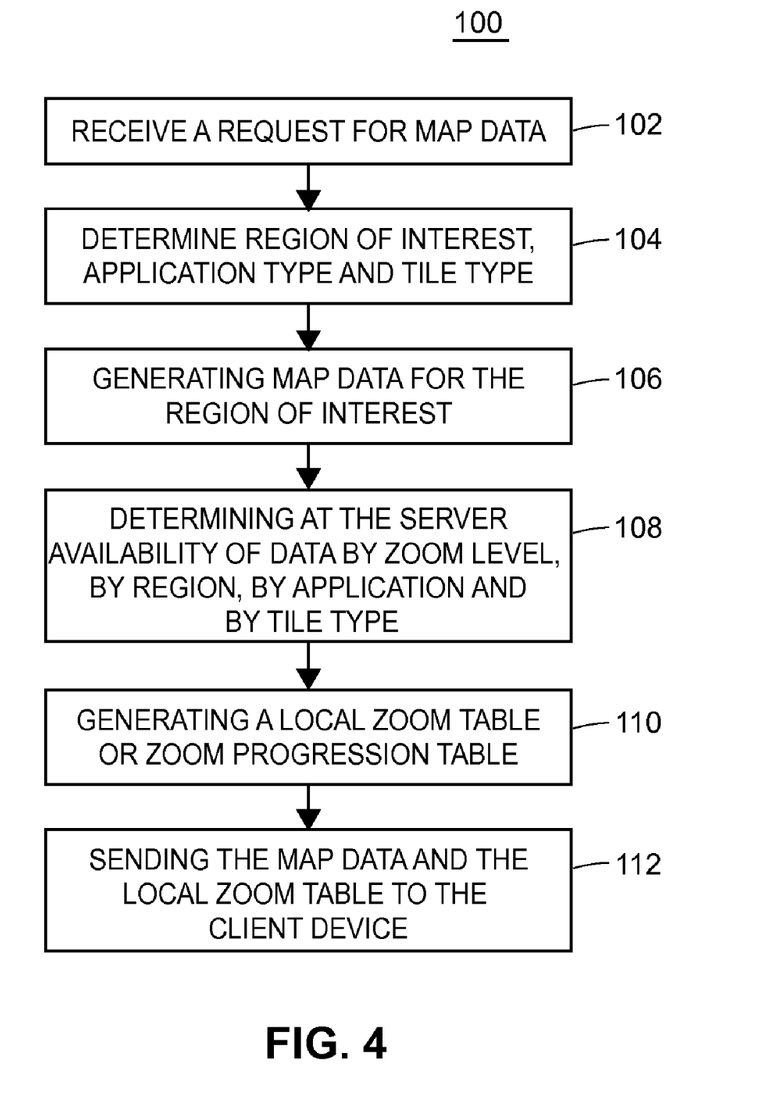
FIG. 4 illustrates a process diagram of a method of processing a zoom table as part of a request for map data.

FIG. 4 illustrates a process flow diagram or flow chart of a method, routine or process 100 that may be used in a computer-implemented method to process a zoom table or zoom progression table such as illustrated in Tables 1-4 as part of a request for map data from a client device. The map data may include both map or image vector data, label data, raster or satellite data, traffic data, transit data, etc.

A block 102 may receive, at a server from the client device over a network, a request for parameters relating to a map application running on the client device.

A block 104 may determine factors related to the request. The request for map data may be for a region of interest selected from a plurality of regions of interest, where each region of interest is a separate geographic area. For example, a request may be received in the form of a request for data, including map data, for a city, a state, a province, or a country. In addition, the request may be associated with map data for a particular application, such as simple map display, driving directions, terrain, etc. Given the region of interest and the application type, the particular map data elements may be determined. These may include, for example, vector data, satellite images or raster data, label data, traffic information, transit status information, etc.

Alternatively, the block 104 may simply see the request for map data and identify a location from the request. In this alternate embodiment, a region of interest may not be selected, but rather, an analysis of data available may be used as discussed below.

A block 106 may generate, at the server, map data for the region of interest at a given zoom level, for example, a default zoom level. In an exemplary embodiment, the map data is available from a either a local or a third party source, as is known. In other embodiments, the map data may be assembled from more than one source, particularly when multiple information types are being supplied, such as vector data, label data and traffic data, for example.

A block 108 may determine, at the server, availability of map data by zoom level for the region of interest. That is, particular regions of interest, such as a city, or other geographic area, may have separate information, such as a database table, that identifies map data by zoom level. Each data type, such as image vector data and label data may be identified by zoom level separately in some embodiments. In other embodiments, separate data availability information may not be used. Rather, such information may be generated on-the-fly as discussed below.

A block 110 may generate a local zoom table at the server for use by the client device. The local zoom table may indicate each zoom level for which new map data is available for the geographic area specified in the request. The local zoom table may include zoom level information for each data type and may include map raster/satellite data, image vector data, label data, traffic information, etc. In some cases, for example, traffic applications, the zoom table may indicate that the map data may be raster/satellite data up to a certain zoom level and may be vector data beyond that point. Further, local rules may apply to certain regions which may be reflected in the zoom table. For example, some countries may restrict display of higher zoom levels of satellite data.

Additionally, different map data may be available for the same application and may have different local zoom tables as a result. In one exemplary embodiment, if a street map application is using satellite imagery, there may not be any map vector data because the map is simply an image. However, there may be label data, such as terrain features, rivers, roads, etc., available at some or all of the supported zoom levels. As a result, the local zoom table may have very few, if any, listings in the map image column, but may be dense in the map label column. In this case, or similar cases, the local zoom table may only have one column of data.

While zoom tables may vary by application by region, zoom tables may also vary by tile type. In areas where only raster data is available, it may be appropriate to request new map image data at each zoom level. Other regional variations may also affect zoom tables. For example, some regions may restrict the maximum zoom level to a fixed scale, so the zoom table may indicate that new raster data is only available for zoom levels 0-15.

Several alternatives are available for generating the local zoom table. One alternative may include building a zoom table, or zoom progression table, from information for the selected geographic area, such as the database table discussed above with respect to block 108.

Another alternative may include analyzing tile data from multiple zoom levels to determine data availability at different zoom levels. Other alternatives for determining at which zoom level data is available are possible.

The zoom table, such as Tables 2-4 above, may show a progression order of zooming for the client, that is, the zoom table may indicate to the map application at the client device zoom levels in the region of interest for which new map data is available. The zoom table may include only the availability of image vector data, only include label data, or may include both. In one embodiment separate zoom tables may be generated and sent for image vector data and label data.

The progression order, that is, the listing of levels for which data is available, may specify skipping zoom levels in the region of interest for which no additional image vector data or label data is available. Conversely, the progression order may specify zoom levels in the region of interest for which new map vector data or label is available.

The zoom table may be generated for all zoom levels accessible at the location of the current request from the client device, as shown in Table 2 and Table 3. Alternatively, zoom table may be generated only for zoom levels near the current zoom level specified in the request or a default zoom level chosen at the server according to the application.

Creating the data for the zoom table may involve comparing the availability of map data by zoom level for the region of interest to a default zoom table, such as the zoom table shown above in Table 1, and modifying a copy of the default zoom table to generate the local zoom table. Alternatively, a routine or module may simply generate data to be sent to the client device using the raw zoom level data discussed above.

Panning and zooming in the map application at the client device may cause a focal point of the map to change from a first region of interest to a second region of interest, that is, to an area with a different availability of map data by zoom level. In such instances, the process above may be repeated.

After both the map data and the zoom table have been generated, a block 112 may send the map data and the local zoom table for the region of interest to the client device.

Figure 5:
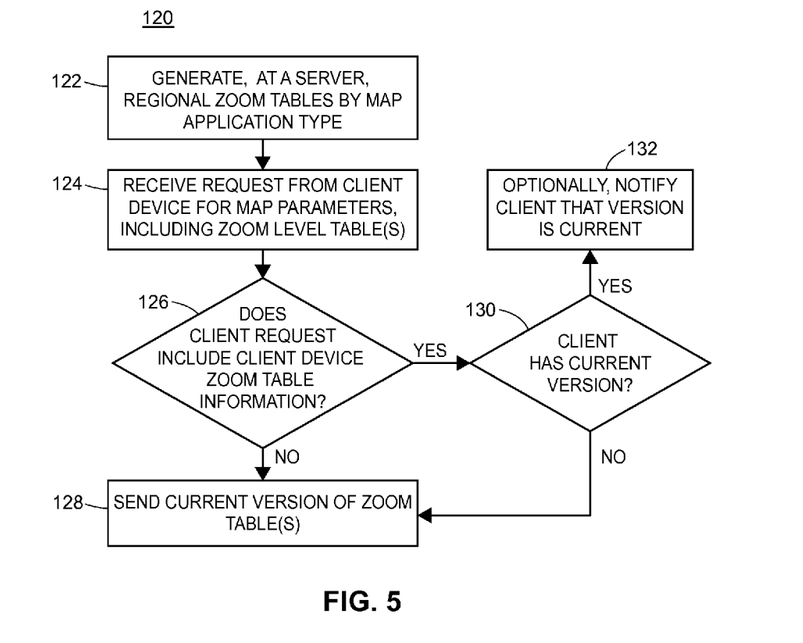
FIG. 5 illustrates a process diagram of another method of processing zoom tables for use at client devices.

FIG. 5 illustrates a process diagram 120 for another embodiment of processing zoom tables for use at client devices 16, 18, 20. A block 122 may generate regional zoom tables for each application type and each region for which different zoom tables are appropriate. Each such zoom table may cover all zoom levels. In an environment where map data changes are relatively rare and many geographic regions have common data availability, the total number of zoom tables may be relatively small, for example, in the dozens. Given that the zoom tables may be simple text or a small binary equivalent, the total size for all available zoom tables may be small, even for a handheld client device, let alone a tablet, laptop, or other computer.

A block 124 may receive, at a server, a request from a client device for map parameters associated with a map session at a client device 16, 28, 20. The request for map parameters may precede an actual request for map tile data, for example, when a map application is starting and is confirming connectivity and map availability. In another embodiment, the request for map parameters may be coincident with a request for map data.

A block 126 may process the request for parameters to determine if the request includes information from the client device that indicates whether local zoom tables are already present at the client device.

If the client device does not have any local zoom tables, the 'no' branch from block 126 may be taken to block 128. The block 128 may send the current version of zoom tables to the client device.

If the client device does have local zoom tables, the 'yes' branch from bock 126 may be taken to block 130. If the local zoom tables are current, the 'yes' branch may be followed to block 132. Block 132 may, optionally, send a confirmation to the client device, may continue processing other parameter data for the client device as needed, or may simply end.

If the client device zoom tables are not current, the 'no' branch may be followed to block 128 and the correct version tables may be sent to the client device.

In one embodiment, each zoom table for different regions and applications may be handled individually both with respect to version numbers and for sending updated versions. In another embodiment, particularly when the data is relatively small, all the zoom tables may be treated as a single entity, such that if any zoom table is not present or any zoom table is out of date, they may all be updated at once. In a refinement of this latter embodiment, checking for version level may involve taking a hash of all the zoom tables at the client device and sending the hash to the map server 14. If the hash does not match the hash of all the current version zoom tables on the server 14, then the entire group of zoom tables is downloaded, as discussed above. An example of such an embodiment at a client device is illustrated with respect to FIG. 6.

Figure 6:
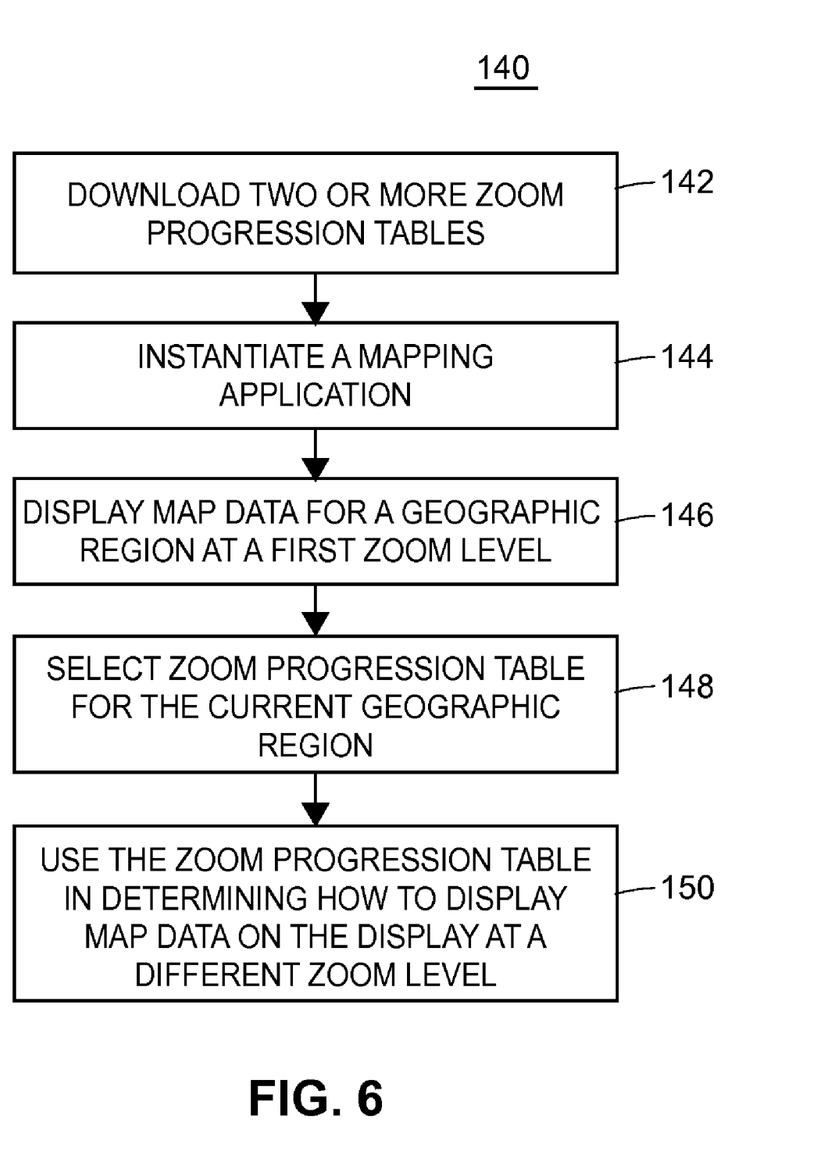
FIG. 6 illustrates a process diagram of a client-side process for using a local zoom table.

FIG. 6 illustrates a process diagram of a client-side process 140 for using a local zoom table. A block 142 receives a plurality, that is, two or more local zoom progression tables from a server. Each zoom progression table may be downloaded separately as needed and requested by the client device 16, 18, 20. In another embodiment, the zoom progression tables may be downloaded at one time and saved locally. Each time the mapping application is instantiated, or otherwise periodically, the mapping application may send a message indicating a version of the local zoom tables. The message may be sent with each request for map data, but in one embodiment, the message may only be sent once at the beginning of a mapping session, or at a time interval, such as once a week. The version indication may be a simple hash of all the zoom progression tables.

A block 144 may instantiate the mapping application, if not already running, and display map data for a geographic region at a first zoom level.

A block 148 may select a zoom progression table for the current geographic region. For example, some countries or regions may have more detail at various zoom levels that other countries or regions. A zoom table specific to the country or region current being displayed may be requested or selected. If more than one local zoom table is present on the client device 16, 18, 20 the most appropriate zoom progression table may be selected. For example, if a client device 16, 18, 20 has a local zoom table for the United States, it may use that zoom table for lower level zoom progressions. However, if in this example, the mapping application focuses on a specific region, such as New York City, the mapping application may switch local zoom tables to a region-specific zoom progression table for New York City as some specific cities have more detail at more zoom levels than other areas.

A block 150 may then use the zoom progression table in determining how to display map data on the client device display at different zoom levels and to determine at which zoom levels to request updated map information.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for providing map data to a client device comprising:
   receiving, at a server from the client device over a network, a request for parameters related to map data for a region of interest, where each region of interest is a separate geographic area;
   generating a local zoom table by comparing the availability of map data by zoom level for the region of interest to a default zoom table and modifying the default zoom table; and
   providing, for use by the client device, the local zoom table indicating each zoom level for which new map data is available and usable by the client to determine whether or not to request new map data in response to a zoom command.

2. The computer-implemented method of claim 1, wherein the local zoom table includes zoom level information for at least one of map feature data or map label data components of the map data.

3. The computer-method of claim 1, wherein receiving the request for parameters includes receiving an indication of presence or version of an existing local zoom table at the client device, and wherein providing the local zoom table for the region of interest is in response to determining that the existing local zoom table at the client device is not present or at an obsolete version.

4. The computer-implemented method of claim 3, wherein providing the local zoom table comprises generating the local zoom table by analyzing tile data from multiple zoom levels to determine a progression order of map tile zooms to be requested by the client.

5. The computer-implemented method of claim 4, wherein the progression order specifies zoom levels in the region of interest for which new label data is available.

6. The computer-implemented method of claim 4, wherein the progression order specifies skipping zoom levels in the region of interest for which no additional label data is available.

7. The computer-implemented method of claim 4, wherein the progression order specifies zoom levels in the region of interest for which new map vector data is available.

8. The computer-implemented method of claim 4, wherein the progression order specifies skipping zoom levels in the region of interest for which no additional map vector data is available.

9. The computer-implemented method of claim 1, further comprising:
   generating a separate local zoom table for each map application type supported at the client device,
   wherein providing the map parameters to the client device includes sending each separate local zoom table for its respective application type.

10. The computer-implemented method of claim 1, wherein providing the local zoom table comprises:
    providing a local zoom table having a first set of values if the request for map data indicates a first software application to use the map data at the client device; and
    providing a local zoom table having a second set of values if the request for map data indicates a second application to use the map data at the client device;
    wherein each of the first application and the second application is selected from a group including (i) a driving directions application for displaying turn-by-turn driving directions and (ii) a terrain map viewing application for interactively viewing a terrain map.

11. A computer server comprising:
    a communications network interface;
    a processor;
    a memory coupled to the processor;
    a first routine, stored in the memory, that executes on the processor to receive, via the communications network interface, a request for map data from a computer device;
    a second routine, stored in the memory, that executes on the processor to parse the request to identify a geographic region corresponding to the request;
    a third routine, stored in the memory, that executes on the processor to send a zoom progression table to the computer device, the zoom progression table specifying zoom levels for which map data is available; and
    a routine that analyzes data by geographic region and by a type of an application making the request in order to determine the zoom progression table to provide.

12. The computer server of claim 11, further comprising a fourth routine that compares the map data that is available for the geographic region to a default zoom progression table and that modifies the default zoom progression table to generate the zoom progression table.

13. The computer server of claim 11, wherein the zoom progression table specifies availability of at least one of map feature data and map label data by zoom level.

14. The computer server of claim 11, wherein the zoom progression table causes the application at the computer device to offer only zoom levels for which there is new data to display.

15. A computer device comprising:
    a display;
    a network interface; and
    a processing element interfaced to the display and the network interface, the processing element configured to:
    receive a zoom progression table specific to a geographic region;
    display map data for a geographic region on the display at a first zoom level;
    access a zoom progression table appropriate to the geographic region by selecting the zoom progression table from a plurality of zoom progression tables received from a server device; and
    use the zoom progression table in determining how to display map data on the display at a different zoom level.

16. The computer device of claim 15, wherein the processing element is configured to use the zoom progression table to determine whether or not to request additional map data from a server device in response to a zoom command specifying the different zoom level.

17. The computer device of claim 15, wherein the processing element is configured to use the zoom progression table to determine which zoom levels other than the first zoom level are displayable.

* * * * *